US012773821B2

(12) United States Patent
Brem et al.

(10) Patent No.: US 12,773,821 B2
(45) Date of Patent: Oct. 27, 2026

(54) METHOD OF PRINTING AN INTERIOR INFILL USING A 3D PRINTER

(71) Applicant: CREATE IT REAL A/S, Aalborg (DK)

(72) Inventors: Folmer Gringer Brem, Aalborg (DK); Jeremie Pierre Gay, Aalborg (DK)

(73) Assignee: CREATE IT REAL A/S, Aalborg (DE)

( * ) Notice: Subject to any disclaimer, the term of this patent is extended or adjusted under 35 U.S.C. 154(b) by 78 days.

(21) Appl. No.: 18/858,443

(22) PCT Filed: Apr. 20, 2023

(86) PCT No.: PCT/EP2023/060310
§ 371 (c)(1),
(2) Date: Oct. 21, 2024

(87) PCT Pub. No.: WO2023/203145
PCT Pub. Date: Oct. 26, 2023

(65) Prior Publication Data

US 2025/0269584 A1 Aug. 28, 2025

Related U.S. Application Data

(63) Continuation of application No. PCT/EP2022/060752, filed on Apr. 22, 2022.

(30) Foreign Application Priority Data

Oct. 11, 2022 (EP) .................................... 22200858

(51) Int. Cl.
*B29C 64/118* (2017.01)
*B29C 64/386* (2017.01)
(Continued)

(52) U.S. Cl.
CPC .......... *B29C 64/118* (2017.08); *B29C 64/386* (2017.08); *B29L 2031/507* (2013.01);
(Continued)

(58) Field of Classification Search
CPC ..... B29C 64/118; B29C 64/386; B33Y 80/00; B33Y 50/00
See application file for complete search history.

(56) References Cited

U.S. PATENT DOCUMENTS 10,532,511 B2 * 1/2020 Patrov .................. B29C 64/106
12,153,399 B2 * 11/2024 Rodrigues ............. G02B 27/30
(Continued)

FOREIGN PATENT DOCUMENTS

CN 109624311 A 4/2019
EP 3345742 A1 7/2018
(Continued)

OTHER PUBLICATIONS

Extended European Search Report from corresponding European Patent Application No. EP22200858.3, Mar. 23, 2023.
(Continued)

*Primary Examiner* — Yunju Kim
(74) *Attorney, Agent, or Firm* — Workman Nydegger

(57) ABSTRACT

A method of printing an interior infill using a 3D printer includes the steps of: defining a planar first infill pattern of lines having a first cross-sectional width; defining a planar second infill pattern of lines having a second cross-sectional width; defining a planar transitional infill pattern of lines having a third cross-sectional width exceeding the first cross-sectional width and the second cross-sectional width; and printing a first set of layers of the first infill pattern, a transitional set of layers of the transitional infill pattern, and a second set of layers of the second infill pattern such that the transitional set of layers is printed between the first set of layers and the second set of layers. An article has a layered interior infill and a computer system is for designing an interior infill of an article.

15 Claims, 6 Drawing Sheets

(51) Int. Cl.

| | |
|---|---|
| ***B29L 31/50*** | (2006.01) |
| ***B33Y 10/00*** | (2015.01) |
| ***B33Y 50/00*** | (2015.01) |
| ***B33Y 80/00*** | (2015.01) |

(52) U.S. Cl.

CPC ............... *B33Y 10/00* (2014.12); *B33Y 50/00* (2014.12); *B33Y 80/00* (2014.12)

(56) References Cited

U.S. PATENT DOCUMENTS

| | | | | |
|---|---|---|---|---|
| 2016/0075089 | A1 | 3/2016 | Duro Royo et al. | |
| 2016/0324260 | A1 | 11/2016 | Guyan | |
| 2017/0057164 | A1 | 3/2017 | Hemphill et al. | |
| 2017/0173867 | A1 | 6/2017 | Zappitello et al. | |
| 2018/0321659 | A1 | 11/2018 | Dasappa et al. | |
| 2018/0345650 | A1 | 12/2018 | Chisena et al. | |
| 2019/0118486 | A1 | 4/2019 | Compton et al. | |
| 2020/0180298 | A1 | 6/2020 | Chisena et al. | |
| 2020/0376743 | A1 | 12/2020 | Jodet et al. | |
| 2021/0068475 | A1 | 3/2021 | Coccia et al. | |
| 2022/0002951 | A1* | 1/2022 | Vandecruys .............. | D21J 3/00 |

FOREIGN PATENT DOCUMENTS

| | | | |
|---|---|---|---|
| WO | 2015102938 | A1 | 7/2015 |
| WO | 2020081954 | A2 | 4/2020 |
| WO | 2021169804 | A1 | 9/2021 |

OTHER PUBLICATIONS

International Search Report from corresponding PCT Application No. PCT/EP2023/060310, May 15, 2023.

International Search Report from corresponding PCT Application No. PCT/EP2022/060752, Sep. 23, 2022.

International Preliminary Report on Patentability from corresponding PCT Application No. PCT/EP2022/060752, Oct. 24, 2023.

* cited by examiner

METHOD OF PRINTING AN INTERIOR INFILL USING A 3D PRINTER

FIELD OF THE INVENTION

The present invention relates to a method of printing an interior infill using a 3D printer. The invention further relates to a computer system for designing an interior infill of an article to be 3D printed. Moreover, the invention relates to an article having a layered interior infill.

BACKGROUND OF THE INVENTION

Additive manufacturing, also referred to as 3D printing, enables rapid prototyping and the ability of producing complex shapes and geometries. For example, 3D printing enables straightforward manufacturing of partially of fully hollow articles. Such articles may have internal truss or wall structures to provide certain properties to the article.

A general drawback of 3D printing is the duration it takes to manufacture the individual article in comparison with conventional manufacturing techniques such as moulding.

Generally, speeding up the printing process may result in inaccuracies of the printed material, particularly for the commonly used 3D printing technique of fused deposition modelling, in which a continuous filament is deposited via a heated printer head. Such inaccuracies may potentially affect compressive properties of a printed article, particularly for articles with soft regions.

SUMMARY OF THE INVENTION

On the above background, it is an object of preferred embodiments of the invention to provide improved printing of interior infills and to provide articles with improved interior infills. In particular, it is an object of preferred embodiments to provide interior infills which may be printed rapidly while providing stability under appliance of an external force. Finally, it is an object of preferred embodiments of the invention to serve as alternatives to conventional solutions.

A first aspect of the present invention relates to a method of printing an interior infill using a 3D printer, the method comprising the steps of:

- defining a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width;
- defining a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width;
- defining a planar transitional infill pattern of lines, wherein respective lines of the transitional infill pattern have a third cross-sectional width exceeding the first cross-sectional width and the second cross-sectional width; and
- printing a first set of layers of the first infill pattern, a transitional set of layers of the transitional infill pattern, and a second set of layers of the second infill pattern such that the transitional set of layers is printed between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer.

If an interior infill is printed based on, e.g., only a first set of layers based on a first infill pattern of lines extending in a general direction, such an interior infill is prone to collapse when a force or stress is applied. An undesired consequence thereof can be that the tactile feeling of a printed article is not smooth, but instead irregular, for example providing a clicking feeling. Further, an article with such an interior infill may tend to not compress smoothly downwards, but instead compress to one side.

By having the first general direction of the first contact layer being different from the second general direction of the second contact layer, the overall strength of the interior infill can be reinforced, reducing the risk of collapse of the interior infill upon applying an exterior force. Moreover, the tendency of compression to a particular side may be reduced.

The provision of a transitional infill pattern printed between (and in contact with) the first set of layers and the second set of layers ensures that these sets of layers are efficiently bonded together, even though the lines in the respective layers have different general directions. Since the cross-section width of lines in the transitional set of layers exceeds the cross-sectional widths of lines in the first and second sets of layers, the transitional set may efficiently bond the first and second sets together, while allowing the first and second sets of layers to be printed rapidly with relatively high printing speed and/or spacing between the lines. Even if lines of the first and second sets of layers are printed inaccurately, the transitional set of layers may nevertheless provide the bonding between the sets, and thereby stability of the infill and the article. Since the first and second sets of layers are typically not visible to the user, inaccuracies in the first and second sets of layers have minimal impact on the visual appearance of the printed article.

Instead of simply relying on increasing the cross-sectional width of lines of all layers, aspects of the invention focus on having a greater cross-sectional width in a transitional set of layers. By selectively providing a greater (third) cross-sectional width in the transitional set of layers (in comparison with cross-sectional widths of lines of other sets of layers), bonding between the first and second sets of layers may be effectively enhanced without necessarily affecting other properties of the printed articles. Notably, hardness properties of the article, determined at least partly by the first and second cross-sectional widths, can be largely maintained when only providing a greater third cross-sectional width of the lines of the transitional set of layers. Similarly, the amount of additional material required, and thereby the mass of the printed article, can be minimized.

Generally, sets of layers based on the first or the second planar infill pattern may not necessarily have desirable compressional properties in isolation. For example, when applying a compressional force perpendicular to the layers of a printed article, the article may tend to provide an irregular deformation versus the force applied. The provision of a transitional set of layers with greater cross-sectional line width may not only improve bonding, but also generally ensure that an applied compressional force is more evenly distributed throughout the printed article. Thereby, an intermediate transitional set of layers may ensure a more regular deformation, thereby potentially ensuring a smooth compression instead of an irregular one. Further, the article may tend not to compress sidewards, but instead evenly downwards, in contrast to some conventional articles without a transitional set of layers.

Aspects of the invention relate to an interior infill printed based on a first infill pattern of lines, a second infill pattern of lines, and a transitional infill pattern of lines. Both the first and the second infill pattern have lines lengthwise extending in a general direction and having a spatially periodic waveform shape with a component perpendicular to the general direction. A spatially periodic waveform shape may for example be sinusoidal, triangular, trapezoidal, or some mixture thereof. In any case, lines lengthwise extending in a general direction across the planar infill pattern of which they are a part of. A pattern may for example comprise a number of sinusoidal lines which lengthwise extend substantially parallelly in a general direction in the pattern. Besides lengthwise extending in a general direction, each line also has a component perpendicular to this general direction, due to the waveform. For example, a sinusoidal line lengthwise extending in a general direction has an amplitude of the sinusoidal shape extending perpendicularly to the general direction. Such an extension perpendicular to the general direction constitutes a component of the waveform shape perpendicular to the general direction. A spatially periodic waveform shape with a component perpendicular to a general direction may alternatively be referred to as a spatially periodic waveform shape which span perpendicularly to a general direction.

Generally, the provision of a waveform shape within the plane of an infill pattern may ensure improved stability of the interior infill. Alternatively, or additionally, waveform shapes may be printed to ensure a particular weight and/or hardness of the printed article.

The cross-sectional widths of lines of infill patterns may be evaluated in the plane of individual infill patterns, and transverse to local longitudinal extension of a given line of a given infill pattern.

An infill pattern may typically be a digital representation upon which a 3D printer is capable of printing an actual physical layer. An infill pattern may thus typically comprise coordinates of lines of the infill pattern. Upon printing a layer based on an infill pattern using a 3D printer, the printed layer may then preferably have a distribution of lines which is substantially similar to the distribution of lines of the infill pattern. However, note that 3D printing is not perfectly accurate, particularly if printing with a large printing speed. Further, an infill pattern may be indicative of cross-sectional widths of lines of the infill pattern, according to which a 3D printer can print lines with these cross-sectional widths. Optionally, an infill pattern may further comprise information indicative of the sequence in which lines of the infill pattern are to be printed.

Commonly, the first infill pattern and the second infill pattern may be similar or even identical, although rotated relative to each other when printed. In principle, the transitional infill pattern may also be similar to the first and/or the second infill pattern, given properly selected cross-sectional widths.

Within the scope of invention, a set of layers (first, second, or transitional) is not restricted to any particular number of layers. A set of layers may for example comprise at least one layer, at least two layers, at least three layers, at least five layers, or at least ten layers.

Applicable methods of 3D printing within the scope of the invention comprise fused deposition modelling, selective laser sintering, stereolithography, and selective laser melting.

In embodiments of the invention, the first general direction of the first contact layer and the second general direction of the second contact layer differ by at least 20 degrees, for example at least 40 degrees, for example at least 60 degrees, such as at least 80 degrees.

By having a relatively large angle between the general directions of lengthwise extension of the first and second contact layer, the stability of the article may potentially be improved.

In embodiments of the invention, the first general direction in layers of the first set of layers is rotated relative to neighbouring layers of the first set of layers; and/or the second general direction in layers of the second set of layers is rotated relative to neighbouring layers of the second set of layers.

A relative rotation within layers of the first set and/or within layers of the second set may potentially improve the stability of the article. An interior infill comprising just vertical walls of lines which are not rotated relative to lines of neighbouring layers may have an increased risk of collapse when a force is applied.

Preferably, the relative rotation of the general direction in layers of the first set and/or the second set of layers is sufficiently small to ensure contact between the layers. For example, the relative rotation between layers preferably maximally shifts the lines by the cross-sectional widths.

In embodiments of the invention, a spatial overlap between the first contact layer and the second contact layer is less than a spatial overlap between the first contact layer and its neighbouring layer in the transitional set of layers and less than a spatial overlap between the second contact layer and its neighbouring layer in the transitional set of layers.

In this context, the spatial overlap may be evaluated along a direction perpendicular to planes of layers of the first, second, and transitional sets of layers. Hence, the spatial overlap may be understood as an area based on the distribution and cross-sectional width of lines of the two layers to be evaluated. Alternatively, the spatial overlap may also be given by a percentage relative to a specific layer, i.e., how large of a percentage of the specific layer overlaps with another layer.

Two identical layers not rotated relative to each other will typically have a spatial overlap identical to the area of the lines of one of the layers. If two identical layers are rotated slightly relative to each other, the spatial overlap will typically decrease with increasing rotation.

Further, in this context, this spatial overlap does not (necessarily) involve actual contact between the layers. For example, the first contact layer and the second contact layer may have a spatial overlap even though they are not neighbouring layers.

A spatial overlap may thus be indicative of contact between two layers if or when the two layers are neighbouring layers.

The provision of a spatial overlap between the first contact layer and the second contact layer which is less than a spatial overlap between a contact layer and its neighbouring layer in the transitional set of layers may ensure that the transitional set of set of layers efficient bonding between the sets of layers.

In practice, such spatial overlaps may be realized by the cross-sectional widths, the relative rotation between the contact layers, the pattern and orientation of the layers in the transitional set of layers, or any combination thereof.

In embodiments of the invention, a spatial overlap between the first contact layer and its neighbouring layer in the transitional set of layers is at least 70% relative to the first contact layer, for example at least 80%, such as at least 90%; and/or wherein a spatial overlap between the second contact layer and its neighbouring layer in the transitional set of layers is at least 70% relative to the second contact layer, for example at least 80%, such as at least 90%.

The provision of certain lower constraints to the spatial overlap of the contact layers to a neighbouring layer in the transitional set of layers may ensure that the different sets of layers are efficiently bonded.

In embodiments of the invention, respective lines of the transitional infill pattern lengthwise extend in a third general direction.

In embodiments of the invention, the third general direction in layers of the third set of layers is rotated relatively to neighbouring layers of the third set of layers.

Similarly to how layers of the first second sets of layers may have a rotation relative to neighbouring layers, the layers in the transitional set of layers may have a rotation relative to neighbouring layers to thereby potentially improve stability.

In embodiments of the invention, the first general direction of the first contact layer is substantially similar to the third general direction of a layer of the transitional set of layers neighbouring the first contact layer, and/or wherein the second general direction of the second contact layer is substantially similar to the third general direction of a layer of the transitional set of layers neighbouring the second contact layer.

The provision of substantially similar directionalities between contact layers and their neighbouring layers in the transitional set of layers may ensure efficient bonding between the different sets of layers.

In embodiments of the invention, the transitional set of layers comprises at least two layers, such as two layers.

At least two layers, such as exactly two layers, in the transitional set of layers, may ensure efficient bonding with the other sets of layers, while having a relatively low number of layers in this set.

In embodiments of the invention, a residue between the transitional infill pattern and printed layers of the transitional set of layers is less than a residue between the first infill pattern and printed layers of the first set of layers and/or less than a residue between the second infill pattern and printed layers of the second set of layers.

In the context of the present invention, a residue between an infill pattern and the printed layers may be understood as an error or discrepancy between the infill pattern and the printed layers. Such discrepancies are not uncommon, particularly when printing with a high printing speed According to the present invention, the magnitude of a residue between a digital infill pattern and a physical printed layer may be evaluated as a sum or an integration of distances between the lines of the infill pattern and the lines of the printed layer along a direction such as the general direction. For example, the distance between the two may be evaluated once per millimetre along a direction.

The provision of a residue between the transitional infill pattern and printed layers of the transitional infill pattern which is less than a residue between the first or second infill pattern and printed layers thereof may enable a greater printing speed when printing the first or second sets of layers.

In embodiments of the invention, the transitional infill pattern is defined based on the first infill pattern and/or the second infill patterns.

In embodiments of the invention, the second infill pattern is the first infill pattern.

By using similar or identical infill patterns, or by basing infill pattern upon one another, the process of defining infill patterns is simplified. Further, a particular overlap between contact layers and layers of the transitional set of layers may be ensured.

In embodiments of the invention, a printing speed is at least 20% greater while a layer of any of the first set of layers and the second set of layers is printed in comparison with a printing speed while a layer of the transitional set of layers is printed, for example at least 40% greater, such as at least 60% greater.

The printing speed may be the printing speed of the 3D printer which performs the step of printing the first set of layers of the first infill pattern, the transitional set of layers of the transitional infill pattern, and the second set of layers of the second infill pattern.

The particular design and printing strategies laid forth by embodiments of the invention may facilitate a printing speed while printing the first and/or second sets of layers which is greater than the printing speed while printing the transitional sets of layers.

Printing speed may for example be evaluated as millimetres per second.

In embodiments of the invention, the third cross-sectional width is at least 20% greater than any of the first cross-sectional width and the second cross-sectional width, for example at least 40% greater, such as at least 60% greater.

The provision of a third cross-sectional width which is greater than the first and second cross-sectional widths by a certain margin may ensure that bonding or overlap between the sets of layers is improved.

In embodiments of the invention, a number of layers in the transitional set of layers is less than a number of layers in any of the first set of layers and the second set of layers, for example 50% less, such as 75% less.

Since the transitional set of layers typically requires more material and slower printing speed, it is preferable to have a relatively small number of layers in the transitional set of layers.

In embodiments of the invention, the transitional set of layers is a first transitional set of layers, wherein the step of printing the first set of layers, the first transitional set of layers, and the second set of layers further comprises printing a second transitional set of layers of the transitional infill pattern such that the second set of layers of the second infill pattern is printed between and in contact with the second transitional set of layers and the first transitional set of layers.

In embodiments of the invention, the second transitional set of layers is substantially similar to the first transitional set of layers.

In other words, some embodiments comprise several transitional sets of layers, for example a first transitional set of layers and a second transitional set of layers. This may permit the concept of transitional sets of layers to repeat periodically throughout an interior infill, thereby further improving stability of printed articles, particularly of printed articles which are relatively tall.

Preferably, the second transitional set of layers has a contacting overlap with layers of neighbouring sets of layers which ensure sufficient bonding between the sets.

In embodiments of the invention, the step of printing the first set of layers, the first transitional set of layers, the second set of layers, and the second transitional set of layers is repeated to spatially and periodically reproduce:

a recurrence of the first set of layers printed between and in contact with a recurrence of the first transitional set of layers and a recurrence of the second transitional set of layers;

a recurrence of the first transitional set of layers printed between and in contact with a recurrence of the first set of layers and a recurrence of the second set of layers;

a recurrence of the second set of layers printed between and in contact with a recurrence of the second transitional set of layers and a recurrence of the first transitional set of layers; and a recurrence of the second transitional set of layers printed between and in contact with a recurrence of the second set of layers and a recurrence of the first set of layers.

Thereby, a printed article may have an interior infill in which the different sets of layers spatially recur in a direction perpendicular to planes of layers of the first set of layers, second set of layers, first transitional set of layers, and second transitional set of layers. In other words, the interior infill may first have a first set of layers, then a transitional set of layers, then a second set of layers, and then a second transitional set of layers. A new first set of layers is then located on top of the second transitional set of layers. On this new first set of layers, a new first transitional set of layers is then located, upon which a new second set of layers is located etc. Thereby, the interior infill is repeated spatially and periodically, such that the different sets of layers recur across the layers of the printed article.

In embodiments of the invention, neighbouring lines in layers of the first set of layers are spaced apart and neighbouring lines in layers of the second set of layers are spaced apart.

The provision of spacing between the lines in the first set of layers and the second set of layers may ensure that the article has a desired property with regards to hardness. Additionally, or alternatively, the gaps may ensure that less material is needed, and therefore that the first and second sets of layers may be printed more rapidly.

In embodiments of the invention, gaps between respective neighbouring lines in layers of the first set of layers are less than the component perpendicular to the first general direction of the first infill pattern, and/or wherein gaps between respective neighbouring lines in layers of the second set of layers are less than the component perpendicular to the second general direction of the second infill pattern.

The provision of restricted gaps between respective neighbouring lines may ensure that the transitional set of layers can straightforwardly connect the first and second sets of layers. A first contact layer with large gaps can be difficult to connect (via a transitional set of layers) to a second contact layer with large gaps when the first and second contact layers are rotated relatively to each other. Sets of layers with larger gaps may for example require a larger number of transitional layers to be properly connected.

In embodiments of the invention, the steps of defining the planar first infill pattern, defining the planar second infill pattern, and defining the planar transitional infill pattern is performed automatically by a computer system.

In embodiments of the invention, the relative magnitudes of the first cross-sectional width, the second cross-sectional width, and the third cross-sectional width are automatically established based on a target hardness of the interior infill.

The relative magnitudes of the first cross-sectional width, the second cross-sectional width, and the third cross-sectional width may for example be established based on a computer system.

In embodiments of the invention, each layer of the first set of layers, the transitional set of layers, and the second set of layers are surrounded by a respective circumferential boundary line of a set of exterior boundary lines which collectively form an exterior surface around the interior infill.

Hence, as an example, a printed article may comprise an interior infill and an exterior surface surrounding the interior infill.

In embodiments of the invention, each line of the first infill pattern and the second infill pattern has a spatial periodic waveform shape which is triangular, sinusoidal, or trapezoidal.

These exemplary shapes are relatively easy to implement and are possible to stack in combination with relative rotation between layers, including relative general directions of the first and second contact layers.

In embodiments of the invention, for the transitional set of layers, each layer extends in a general direction which is rotated by an equidistant angle relative to general directions of its two neighbouring layers.

For example, the first general direction of the first contact layer and the second general direction of the second contact layer differ by 80 degrees, and the transitional set of layer comprises three layers, each extending in a general direction which is rotated by an equidistant angle of 20 degrees relative to general directions of its two neighbouring layers. Relative to the general direction of the first contact layer, the layers of the transitional set of layers are then rotated by 20 degrees, 40 degrees, and 60 degrees. As a result, the transitional set of layers smoothly connects the first and second contact layers having different angles, which in turn may ensure improved bonding.

In embodiments of the invention, the transitional set of layers comprises at least one layer in which respective lines extend in the first general direction and at least one layer in which respective lines extend in the second general direction.

Thereby, a discrepancy in overlap due to the change in general direction of extension between the first contact layer of the first set of layers and the second contact layer of the second set of layers is addressed by the transitional set of layers.

The at least one layer in which respective lines extend in the first general direction and the at least one layer in which respective lines extend in the second general direction may or may not be the same layer(s).

A second aspect of the invention relates to a computer system for designing an interior infill of an article to be 3D printed, the computer system comprising:

an infill pattern design block configured to define a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width, the infill pattern design block further configured to define a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width, the infill pattern design block further configured to define a planar transitional infill pattern of lines, wherein respective lines of the transitional infill pattern have a third cross-sectional width exceeding the first cross-sectional width and the second cross-sectional width;

a pattern orientation block configured to automatically establish a relative infill layer orientation among layers of a first set of layers of the first infill pattern, of a transitional set of layers of the transitional infill pattern, and of a second set of layers of the second infill pattern, wherein the transitional set of layers is printed between the first set of layers and the second set of layers, wherein the first set of layers comprises a first contact layer in contact with the transitional set of layers and the second set of layers comprises a second contact layers in contact with the transitional set of layers, wherein the first general direction of the first contact layers is different from the second general direction of the second contact layer; and an infill transmission block configured to transmit the first infill pattern, the second infill pattern, the transmission infill pattern, and the relative infill layer orientation established by the pattern orientation block to a 3D printer.

A computer system according to preferred embodiments of the invention may typically provide advantages similar to those provided by methods of printing an interior infill according to the invention.

A computer system for designing an interior infill according to the present disclosure may typically rely on software operating via conventional well-known computer hardware, such as a processing unit, computer memory, computer storage, etc. Alternatively, the computer system may operate via distributed and/or cloud computation.

In case of the present invention, preferred embodiments of the computer system are based on various computerized blocks, which combine to form at least part of a software for designing the interior infill. An infill pattern design block defines various infill patterns, a pattern orientation block establishes relative infill layer orientation among layers, and an infill transmission block transmits the infill patterns and the relative infill layer orientation to a 3D printer. In practice, these blocks may be implemented as a single program, or distributed across multiple programs or functions configured to operate in combination.

Typically, the blocks operate automatically, for example based on input, such as user input. For example, the blocks may operate based on article properties or a digital article design of an article to be printed. For example, the blocks may receive coordinates of an exterior surface of the article to be printed, upon which infill patterns are defined and relative infill layer orientation is established. Further, such automated operation may be based on a target hardness or other article properties of the article to be printed. The computer system may also rely on a database storing exemplary infill patterns and/or exemplary lines of infill patterns, upon which infill patterns are based, designed and/or selected, followed by establishment relative infill layer orientation.

In embodiments of the invention, the computer system comprises a user input block in which a user can input a desired target hardness, upon which the infill pattern design block automatically defines any of the first infill pattern, the second infill pattern, the transitional infill pattern, and the relative infill layer orientation.

In embodiments of the invention, any of the first cross-sectional width, the second cross-sectional width, and the third cross-sectional width are automatically established based on the target hardness.

In embodiments of the invention, the target hardness is a non-uniform across the article to be 3D printed.

In embodiments of the invention, the computer system further comprises a set number block configured to automatically establish the relative number of layers among the first set of layers, the second set of layers, and the third set of layers.

Thereby, a complex infill pattern with particular properties can quickly be automatically established based on simple user input.

The relative number of layers may for example be established based on the target hardness, or any of the first cross-sectional width, the second cross-sectional width, and the third cross-sectional width.

In embodiments of the invention, any of the relative number of layers and the cross-sectional widths are selected such that a sum of respective relative layer fractions, each multiplied with a respective corrected hardness, equals the target hardness. Each respective corrected hardness is associated with each respective cross-sectional width of the first, the second, and the third cross-sectional width. The respective layer fraction is the fraction of layers in a particular set.

This is exemplified in the following using a Shore hardness scale, namely a Shore hardness type A scale.

The target hardness is set to 30 A. The first cross-sectional width equals the second cross-sectional width, and if an article were to be printed using only such a width for all layers, the article would have an actual hardness of 20 A. This hardness is thereby associated with the first and second cross-sectional widths and may be referred to as a corrected hardness. The third cross-sectional width exceeds the first and second cross-sectional widths, and if the article were to be printed only using this width, then the article would have a (corrected) hardness of 60 A. The relative number of layers is automatically selected such that 25% of the layers are in the transitional set of layers, and such that the rest of the layers are distributed among the first and the second sets of layers. Thereby, the sum of respective relative layer fractions, each multiplied with a respective corrected hardness, is $0.25\times60$ A$+0.75\times20$ A$=30$ A, i.e., the desired target hardness. Accordingly, the relative number of layers was established automatically based on the target hardness.

In some embodiments, the corrected hardness is further corrected based on the exact infill pattern upon which a given set of layers are to be printed. An infill pattern which fills out more space tends have a larger hardness.

In embodiments of the invention, the computer system is configured to print the interior infill according to the method of the present disclosure.

A third aspect relates to an article having a layered interior infill, the interior infill comprising:

a first set of layers, each layer of the first set of layers having a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width;

a second set of layers, each layer of the second set of layers having a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width; and a transitional set of layers, each layer of the transitional set of layers having a planer transitional infill pattern of lines, wherein respective lines of the transitional infill pattern have a third cross-sectional width exceeding the first cross-sectional width and the second cross-sectional width, wherein the transitional set of layers is positioned between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer.

Preferred embodiments of articles according to the above-described aspect may have improved weight and/or compressive properties.

In embodiments of the invention, the article comprises an exterior surface around the interior infill, wherein each layer of the first set of layers, the transitional set of layers, and the second set of layers are surrounded by a respective circumferential boundary line of a set of exterior boundary lines which collectively form the exterior surface.

In embodiments of the invention, the transitional set of layers is a first transitional set of layers, wherein the interior infill further comprises a second transitional set of layers, wherein the second set of layers is positioned between and in contact with the first transitional set of layers and the second transitional set of layers.

In embodiments of the invention, the article is a footwear insole or footwear inlay.

The compressive properties which may be provided by some embodiments the invention are particularly advantageous for footwear insoles or footwear inlays.

Such items require specific compressive properties which can be difficult to obtain using conventional methods, particularly conventional additive manufacturing methods.

Moreover, the requirements of footwear insoles and inlays are individual and can thereby vary vastly between different people. Footwear insoles and inlays with a transitional set of layers surrounded by first and second sets of layers with lines of smaller cross-sectional width according to the invention may accommodate such individual requirements.

In embodiments of the invention, a material of the article is a thermoplastic material.

In embodiments of the invention, the article is 3D printed, for example according to the method of the present disclosure.

BRIEF DESCRIPTION OF THE DRAWINGS

Embodiments of the invention will now be further described by reference to the accompanying drawings, in which.

DETAILED DESCRIPTION

Figure 1:
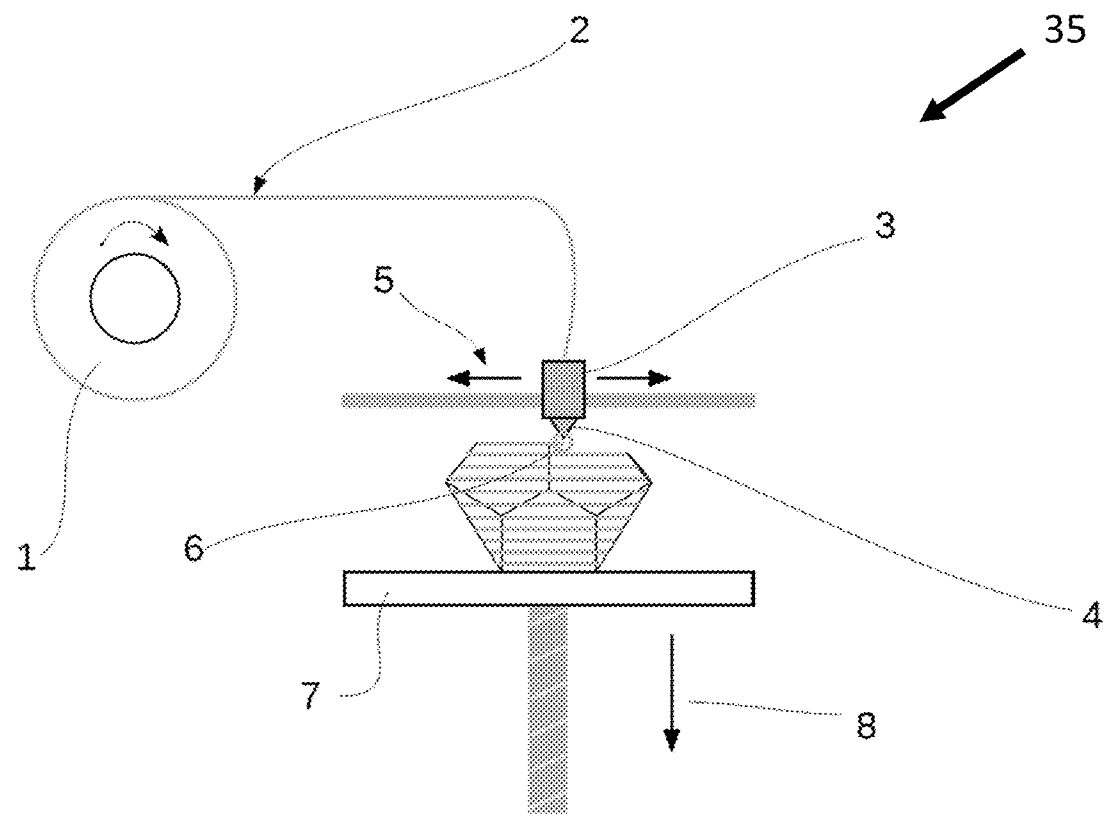
FIG. 1 illustrates 3D printing of an article via fused deposition modelling.

FIG. 1 illustrates 3D printing of an article via fused deposition modelling (FDM). A printer configured to print via FDM may be referred to as an extrusion-based printer. The illustrated printer 35 comprises a filament supply 1 in the form of a spool of thermo-polymer filament. The filament 2 is supplied by a feeding motor (not shown) to an extruder 3. The feeding motor is controlled according to a computer-based program comprising series of commands or actions which, when executed correctly, provide a printed article. This series of commands or actions may also be referred to as a tool command. The extruder 3 comprises a nozzle 4 and an electrical heater (not shown). The heater is also controlled via the tool command. In this embodiment, the tool is constituted by the filament supply and the extruder including the nozzle and heater, and the shape defining structure is the nozzle 4. The extruder 3 is fixed to a motion structure which can move the extruder 3, heater, and nozzle 4 in two (horizontal) directions of a Cartesian space illustrated by the arrow 5.

The shape defining structure of the tool, i.e., in this case the nozzle 4, has a tool position, and the tool position determines the corresponding adding-position 6 where the material, i.e., melted filament, is added. The tool command controls the movement of the nozzle 4 and thereby of the adding position 6. Thereby, the illustrated FDM printer 35 as capable of printing an article. One layer of the article is printed at a time, and when one layer is finished, the stage 7 is moved downwards as indicated by the arrow 8. The stage 8 may alternatively be referred to as a base plate or a print plate.

Figure 2:
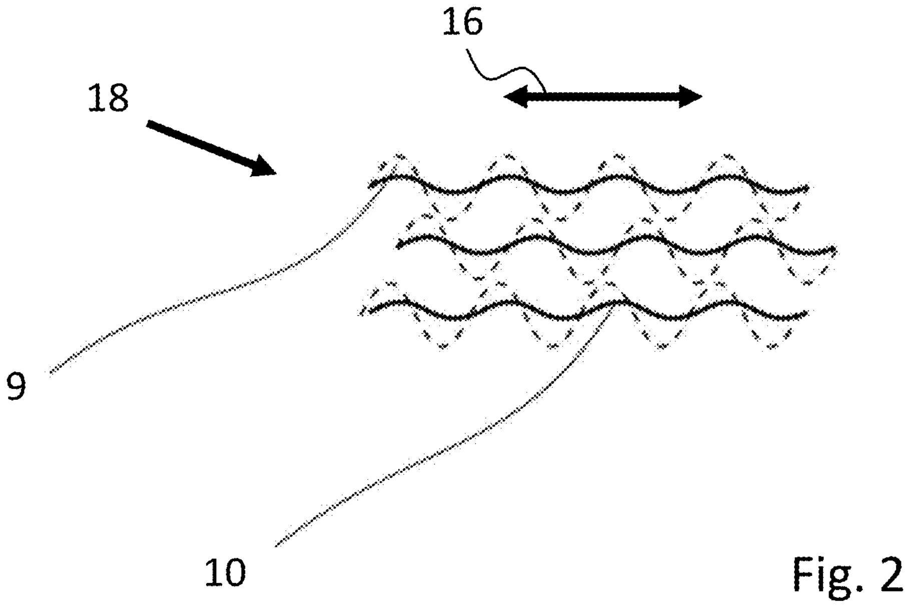
FIG. 2 illustrates lines of an infill pattern.

FIG. 2 illustrates lines 9,10 of an infill pattern 18. The dashed lines 9 are lines of a digitally defined infill pattern, upon which a 3D printer deposits material. These dashed lines 9 may typically correspond to the actual motional pattern by which an adding position or a nozzle of a printer head is moved.

The lines 9 of the infill pattern lengthwise extend in a general direction 16 as indicated by an arrow in the figure. Moreover, the lines 9 have a spatially periodic waveform shape, namely a sinusoidal shape, with a component perpendicular to the general direction 16. In other words, the lines 9 or not entirely straight, but have a curvature which results in the lines spanning transverse to the general direction 16. Such an infill pattern may, for example, be used to provide particular compressive properties of a printed article.

However, the actual positions in which material is eventually located after being deposited and solidifying can be different from the digital infill pattern upon which the lines are printed. This is illustrated in FIG. 2 by the solidly drawn printed lines 10. In comparison with the dashed lines 9 of the infill pattern, the printed lines are somewhat compressed transversely to the general direction 16 and slightly displaced in the general direction 16.

Such discrepancies between an intended infill pattern of lines 9 and the printed lines 10 can be particularly prominent when printing with a large printing speed or a low cross-sectional width.

As a consequence of the discrepancy between lines 9 of the infill pattern, and the lines 10 which are actually printed, the compressive properties of the printed article, of which the printed lines 10 form part of, can be erroneous in comparison with the properties actually intended.

Figure 3:
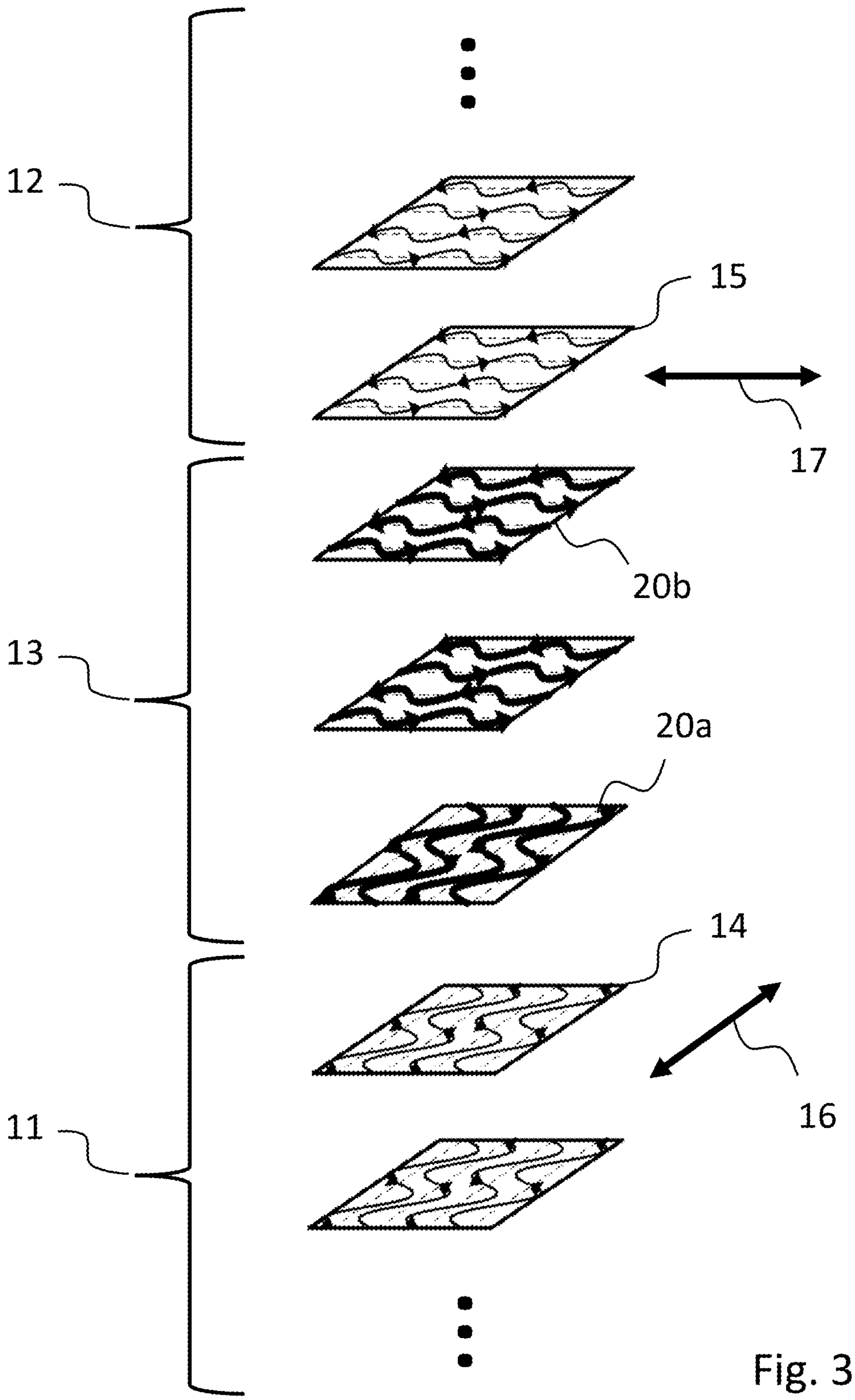
FIG. 3 illustrates an exploded view of a first set of layers, a second set of layers, and a transitional set of layers printed according to an embodiment of the invention.

FIG. 3 illustrates an exploded view of a first set of layers 11, a second set of layers 12, and a transitional set of layers 13 printed according to an embodiment of the invention. In the illustrated exploded view, the various layers are spaced apart, but in an actual article, the individual layers are stacked and in contact with two neighbouring layers. These infill layers can thereby collectively form an interior of a printed article.

The individual layers of the first set of layers 11 are printed based on a first infill pattern. Thereby, the lines of one layer of the first set of layers 11 are substantially similar to lines of another layer of the first set of layers 11. Nevertheless, respective layers of the first set of layers 11 may be shifted transversely and/or longitudinally relative to neighbouring layers of the first set 11. Further, respective layers of the first set of layers 11 may be rotated relative to neighbouring layers of the first set 11. Preferably, any rotations and shifts should be of a magnitude which ensures that substantial contact is maintained between neighbouring layers. In addition, the spatial extent of the different layers of the first set 11 may vary among the layers due to shape and size of an exterior surface of the printed article of which the interior infill is a part of.

The respective lines of the first infill pattern lengthwise extent in a first general direction 16 and have a spatially periodic waveform shape with a component perpendicular to the first general direction. Further, the respective lines of the first infill pattern have a first cross-sectional width.

The individual layers of the second set of layers 12 are printed based on a second infill pattern, similarly to how the individual layers of the first set of layers 11 are printed based on a first infill pattern. The lines of the individual layers of the second set 12 are thereby also substantially similar, given that neighbouring layers may be shifted, rotated, and/or have different spatial extents.

The respective lines of the second infill pattern extent in a second general direction 17, have a spatially period waveform shape with a component perpendicular to the second general direction, and have a second cross-sectional width.

In this particular embodiment, the first and the second infill patterns are substantially identical, albeit the two sets of layers 11,12 are printed such that the first general direction 16 in the first set of layers 11 is different from the second general direction 17 in the second set of layers 17. Namely, these two general directions 16,17 of the printed layers form an angle of approximately 90 degrees.

The vertical ellipses drawn in the top section of the first set of layers 11 and in the bottom section of the second sets of layers 12 indicate that these sets 11,12 comprises additional layers not drawn.

The transitional set of layers 13 are printed based on a transitional infill pattern of lines. The respective lines of this set 13 have a third cross-sectional width. This third cross-sectional width exceeds the first cross-sectional width and the second-cross sectional width, which is also indicated in the illustration by the width by the lines of the different sets 11,12,13 are drawn.

The sets of layers 11,12,13 are printed such that the second set of layers 12 is stacked on top of the transitional set of layers 13, which in turn is stacked on top of the first set of layers 11. The transitional set of layers 13 is thereby in contact with a layer of the first set of layers 11 referred to as a first contact layer 14, and in contact with a layer of the second set of layers 12 referred to as a second contact layer 15.

As previously described, the first and second sets of layers 11,12 are printed with the first general direction 16 in the first set of layers 11 being different from the second general direction 17 in the second set of layers 12. In terms of the contact layers 14,15, the first general direction 16 of the first contact layer 14 is hence different from the second general direction 17 of the second contact layer 15.

If the layers were printed without the transitional set of layers 13, the first contact layer 14 and the second contact layer 15 would be neighbouring layers. However, due to the different orientations of the general directions 16,17 of these layers, these two layers are not well-suited for being stacked on each other. The gaps between the lines are too large. Nevertheless, the different orientations are preferable to ensure proper mechanical stability of the article.

In this embodiment, the transitional set of layers 13 address this issue with by the provision of a transitional set of layers 13 having a third cross-sectional width exceeding the widths of the lines first and second sets 11,12. This increased cross-sectional width at least partially compensates for the large gaps between the lines within the first and second sets of layers 11,12. Layers with lines of greater cross-sectional width are easier be stacked, and can thereby bridge different sets of layers of smaller cross-sectional width.

In this particular embodiment, a layer 20*a* (bottommost layer of the transitional set 13) of the transitional set of layers 13 in contact with the first contact layer 14 has approximately the same waveform shape and general direction as the first contact layer 14, but with lines having a larger cross-sectional width. Similarly, a layer 20*b* (uppermost layer of the transitional set 13) of the transitional set of layers 13 in contact with the second contact layer 15 has approximately the same waveform shape and general direction as the second contact layer 15, but again with lines having a larger cross-sectional width.

Figure 4:
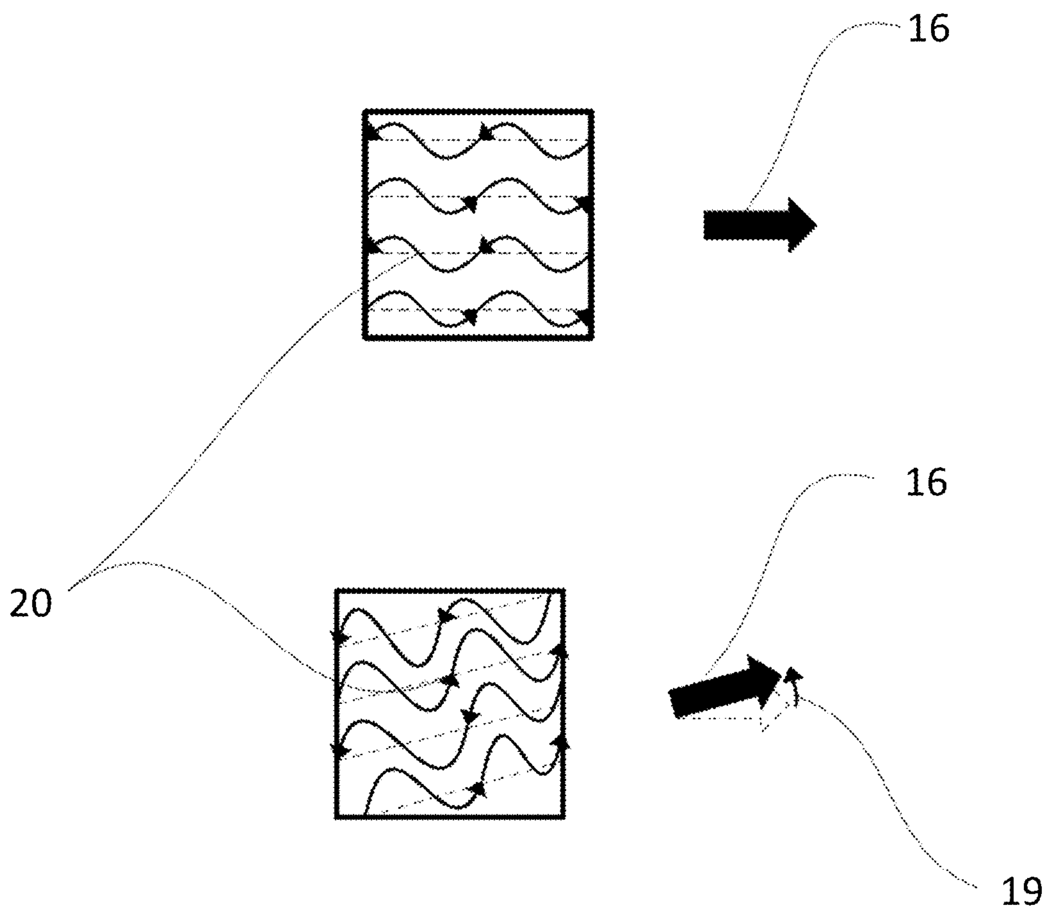
FIG. 4 illustrates a relative rotation among layers of a set of layers.

FIG. 4 illustrates a relative rotation among layers 20 of a set of layers. The figure shows a first layer 20 at the top of the figure, and second layer 20 at the bottom of the figure.

The first layer 20 is based on an infill pattern in which the respective lines lengthwise extend in a first general direction 16, as indicated by an arrow to the right of the first layer 20. Similarly, the second layer 20 is also based on an infill pattern in which the respective lines lengthwise extend in a first general direction 16, as indicated by another arrow to the right of the second layer 20.

However, the first general direction 16 of the second layer 20 has a relative rotation 19 in comparison with the first general direction 16 of the first layer 20. Nevertheless, these two layers 20 are neighbouring layers which are part of the same set of layers (such as a first set of layers). Hence, the illustrated layers 20 can for example be part of an embodiment in which the general direction in layers of a set of layers is rotated relative to neighbouring layers of that set of layers.

In the figure, the relative rotation 19 is exaggerated for illustrative purposes. In preferable embodiments, the actual rotation is smaller to ensure contact between lines of the two layers 20.

The relative rotation between two neighbouring layers may extend partially of fully throughout a given set of layers, such that the general direction of layers of a set of layers is progressively rotated relative to neighbouring layers of that set of layers.

Figure 5:
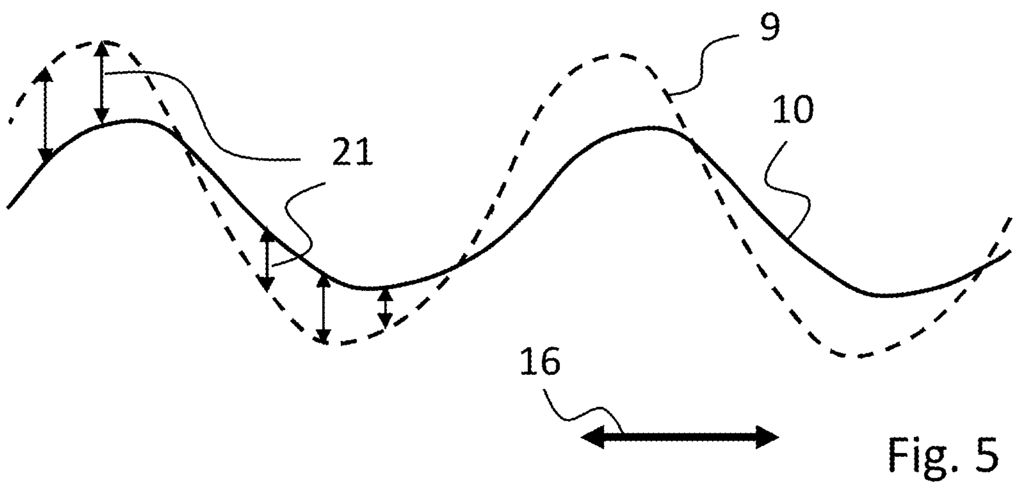
FIG. 5 illustrates a residue between a line of an infill pattern and a line of a printed layer, FIG. *6a-f* illustrate different layers and spatial overlaps among these.

FIG. 5 illustrates a residue 21 between a line of an infill pattern 9 and a line of a printed layer 10. Namely, the dashed line 9 is a line of a digitally defined infill pattern upon which a 3D printer deposits material and the solidly drawn line 10 is the actual position in which material is located after deposition and solidification, similarly to FIG. 2.

In FIG. 5, the residue 21 between the two lines 9,10 is indicated by arrows. These arrows are regularly spaced along the general direction 16 in which the lines 9,10 extend, and perpendicular to that general direction 16.

The residue 21 is indicative of a discrepancy between the line 9 of the infill pattern and the printed line 10. Here, as indicated by the arrows, the residue 21 can be evaluated as a sum of distances along the general direction 16. If arrows were illustrated along the entire length of the lines 9,10, the residue 21 would correspond to the sum of lengths of these arrows. In practice, the distances between the points at which residue is evaluated (distances between arrows), may for example be 1 mm or 2 mm. Alternatively, the residue may be evaluated as the area spanned between the two lines 9,10, which may for example be calculated by integration along the general direction 16.

According to embodiments of the invention, a residue between (lines of) the transitional infill pattern and (lines of) printed layers of the transitional set of layers is less than a residue between (lines of) the first infill pattern and (lines of) printed layers of the first set of layers and/or less than a residue between (lines of) the second infill pattern and (lines of) printed layers of the second set of layers. In practice, different separate residues as outlined above may permit a greater printing speed when printing the first and/or second set of layers, without compromising the overall stability of the printed article. In particular, the transitional set having smaller residue can ensure adequate bonding between the first and second sets of layers.

In practice, lines are typically defined and printed with some cross-sectional width, such a first, second, or third cross-sectional width. In other words, a segment of a line has some transverse extension transversely to its local lengthwise extension. Given this, the residue may be calculated/measured from the centre of the transverse extension of a given segment of a given line.

Figure 6A:
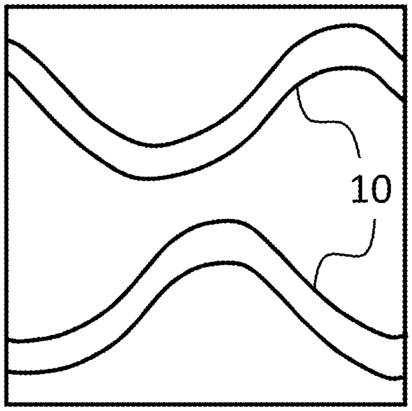
Figure 6B:
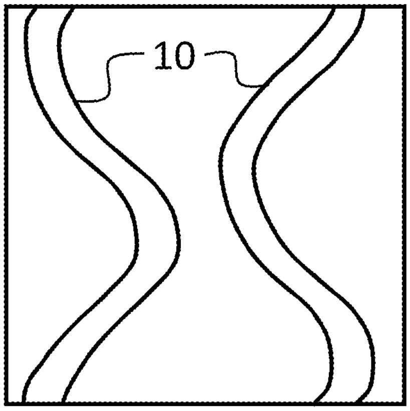
Figure 6C:
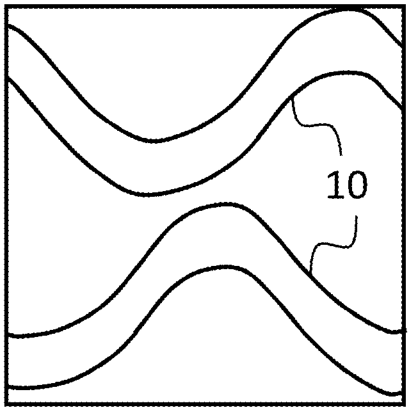
Figure 6D:
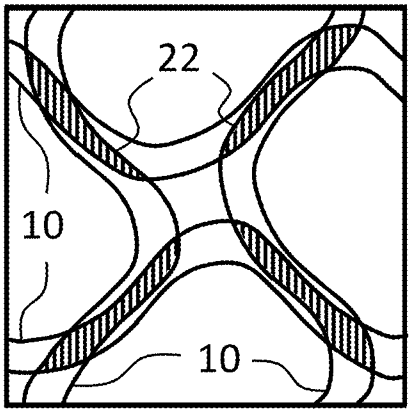

FIG. 6*a*-*f* illustrate different layers 20 and spatial overlaps among these. FIG. 6*a* illustrates an exemplary contact layer of, e.g., a first set of layers. FIG. 6*b* illustrates another exemplary contact layer of, e.g., a second set of layers. FIG. 6*c* illustrates an exemplary layer of a transitional set of layers. In FIG. 6*d*, the layers illustrated in FIGS. 6*a* and 6*b* are superimposed, and the spatial overlap 22 between the lines 10 of these layers is indicated. In a similar manner, in FIG. 6*e*, the layers illustrated in FIGS. 6*a* and 6*c* are superimposed, and in FIG. 6*f*, the layers illustrated in FIGS. 6*b* and 6*c* are superimposed.

FIG. 6*a* illustrates a section of an exemplary contact layer of, e.g., a first set of layers. In the illustrated section, two printed lines 10 are displayed extending lengthwise in a horizontal direction (relative of the orientation of the figure), having a spatially periodic waveform shape and a first cross-sectional width. Correspondingly, FIG. 6*b* illustrates a section of another exemplary contact layer of, e.g., a second set of layers, with two printed lines 10 extending lengthwise in a vertical direction, having a spatially periodic waveform shape and a second cross-sectional width substantially similar to the first cross-sectional width.

FIG. 6*c* illustrates a section of an exemplary contact layer of a transitional set of layers. The two printed lines 10 extend lengthwise in a horizontal direction, have a spatially periodic waveform shape, and a third cross-sectional width exceeding the first and second cross-sectional widths. The extension of lines in FIG. 6*c* is similar to the extension of lines in FIG. 6*a*. That is, in both subfigures, the lines 10 extend horizontally.

In FIG. 6*d*, the two sections of layers of FIGS. 6*a* and 6*b* are illustrated in a superimposed view. The parts of the lines 10 which has a spatial overlap 22 are indicated by pattern fill. If these two layers were printed as neighbouring layers, these spatial overlaps 22 would be the approximate contact surfaces between the two layers. To ensure proper stability of a printed article, the regions in which an upper layer is not in contact with a neighbouring lower layer should not be too large. If the illustrated layers were to be printed in contact with each other without a transitional set of layers, the resulting article could potentially suffer from a lack of such proper stability.

Figure 6E:
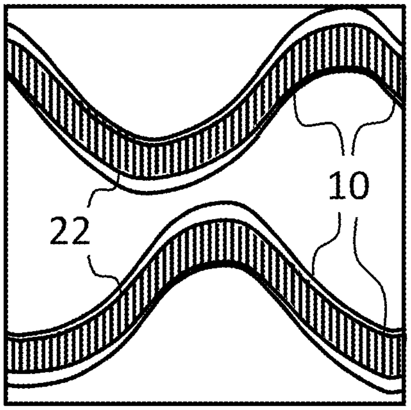
Figure 6F:
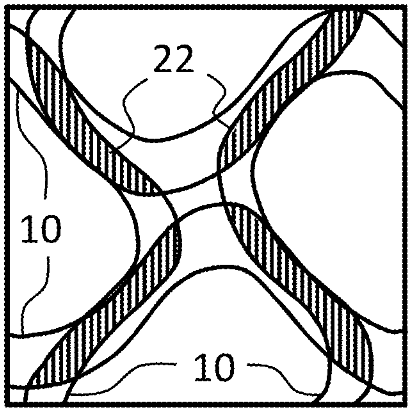

In FIGS. 6*e* and 6*f*. the contact layers of FIGS. 6*a* and 6*b* are respectively illustrated superimposed with the transitional layer of FIG. 6*c* to display the spatial overlap 22 of lines 10 of these layers.

A comparison of FIG. 6*d* with FIGS. 6*e* and 6*f* exhibits that the transitional layer of FIG. 6*c* has a greater spatial overlap 22 with both of the contact layers of FIGS. 6*a* and 6*b*, than these two contact layers have among themselves. Hence, the provision of a transitional infill pattern of lines having a third cross-sectional width exceeding first and second cross-sectional widths improves stability of interior infills in which separate layers have lines extending in different general directions.

Figure 7:
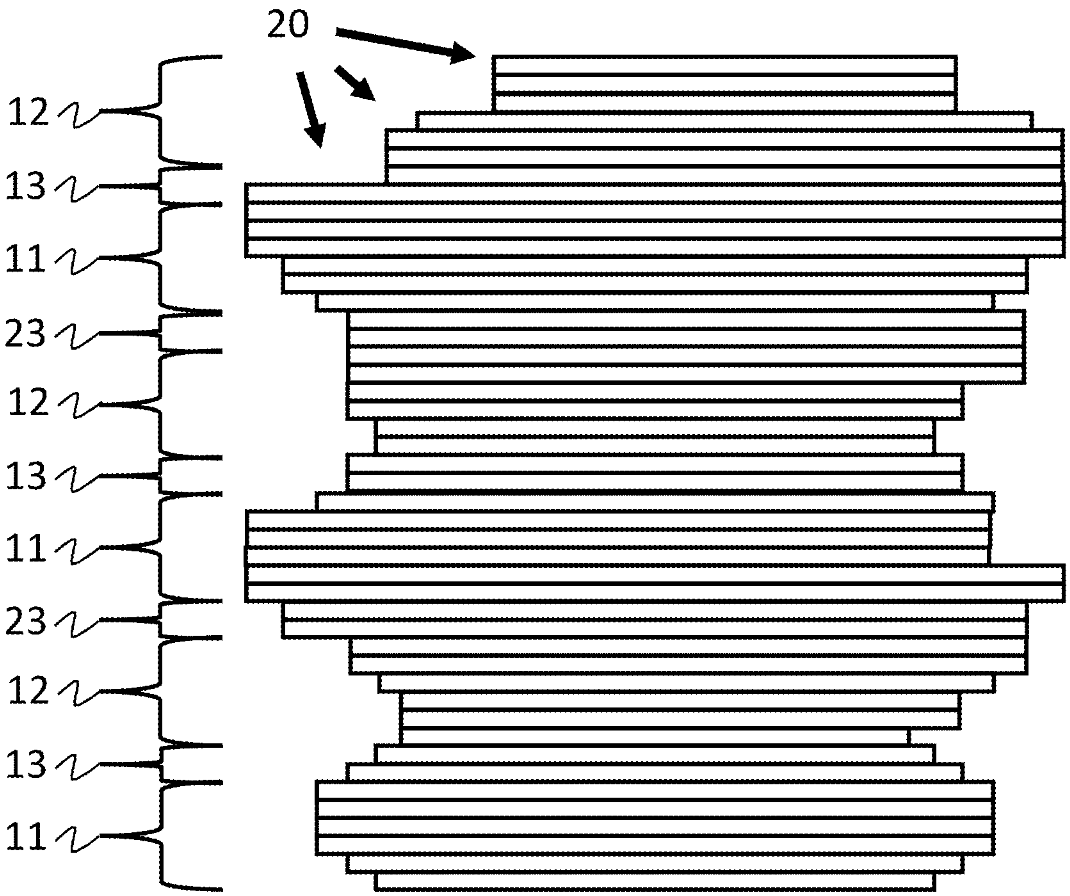
FIG. 7 illustrates a side view of a layered infill of an article.

FIG. 7 illustrates a side view of a layered infill of an article. In particular, the layered infill is printed with a first set of layers 11, a first transitional set of layers 13, a second set of layers 12, and a second transitional set of layers 23. Further, the layers have been printed such that the first set of layers 11, the first transitional set of layers 13, the second set of layers 12, and the second transitional set of layers 23 spatially and periodically reproduces in a vertical direction perpendicular to the planes of the layers of the sets of layers 11,12,13,23.

Hence, a recurrence of the first set of layers 11 is printed between and in contact with a recurrence of the first transitional set of layers 13 and the second transitional set of layers 23. A recurrence of the first transitional set of layers 13 is printed between and in contact with a recurrence of the first set of layers 11 and a recurrence of the second set of layers 12. A recurrence of the second set of layers 12 is printed between and in contact with a recurrence of the second transitional set of layers 23 and a recurrence of the first transitional set of layers 13. And finally, a recurrence of the second transitional set of layers 23 is printed between and in contact with a recurrence of the second set of layers 12 and a recurrence of the first set of layers 11.

This exemplary embodiment has a total of five transitional sets of layers 13,23, each having two layers, and a total of six first and second sets of layers 11,12, each having six layers. Hence, the article has a total of forty-six layers, of which ten are layers of the transitional sets 13,23 and thirty-six layers are of the first and second sets of layers 11,12. Hence approximately 22% of the layers are layers of a transitional set of layers.

Considering individual sets of layers, the number of layers in the transitional set of layers is less than the number of layers in any of the first set of layers and the second set of layers. Specifically, the transitional set of layers has two layers, which is approximately 67% less than the number of layers in any of the first set of layers and the second set of layers, each set comprising six layers of which two layers is approximately 33%.

Figure 8:
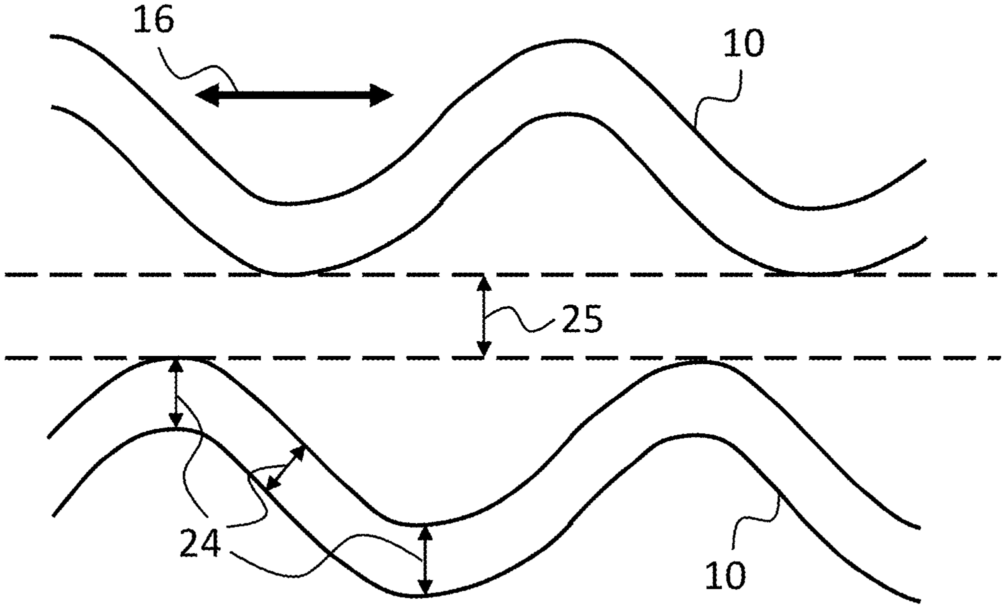
FIG. 8 illustrates a cross-sectional width and a gap between neighbouring lines, FIG. 9 schematically illustrates a computer system according to an embodiment of the invention.

FIG. 8 illustrates a cross-sectional width 24 and a gap 25 between neighbouring lines 10. The cross-sectional width 24 is measured in the plane of the line, transversely to its local longitudinal extension. A gap 25 between neighbouring lines 10 may be measured in the plane of the lines 10, perpendicular to the general direction 16 in which the lines extend, and relative to the span of the lines 10 transverse to the general direction 16. Such a gap 25 between lines 10 may be employed to impose particular compressive properties to an article.

Figure 9:
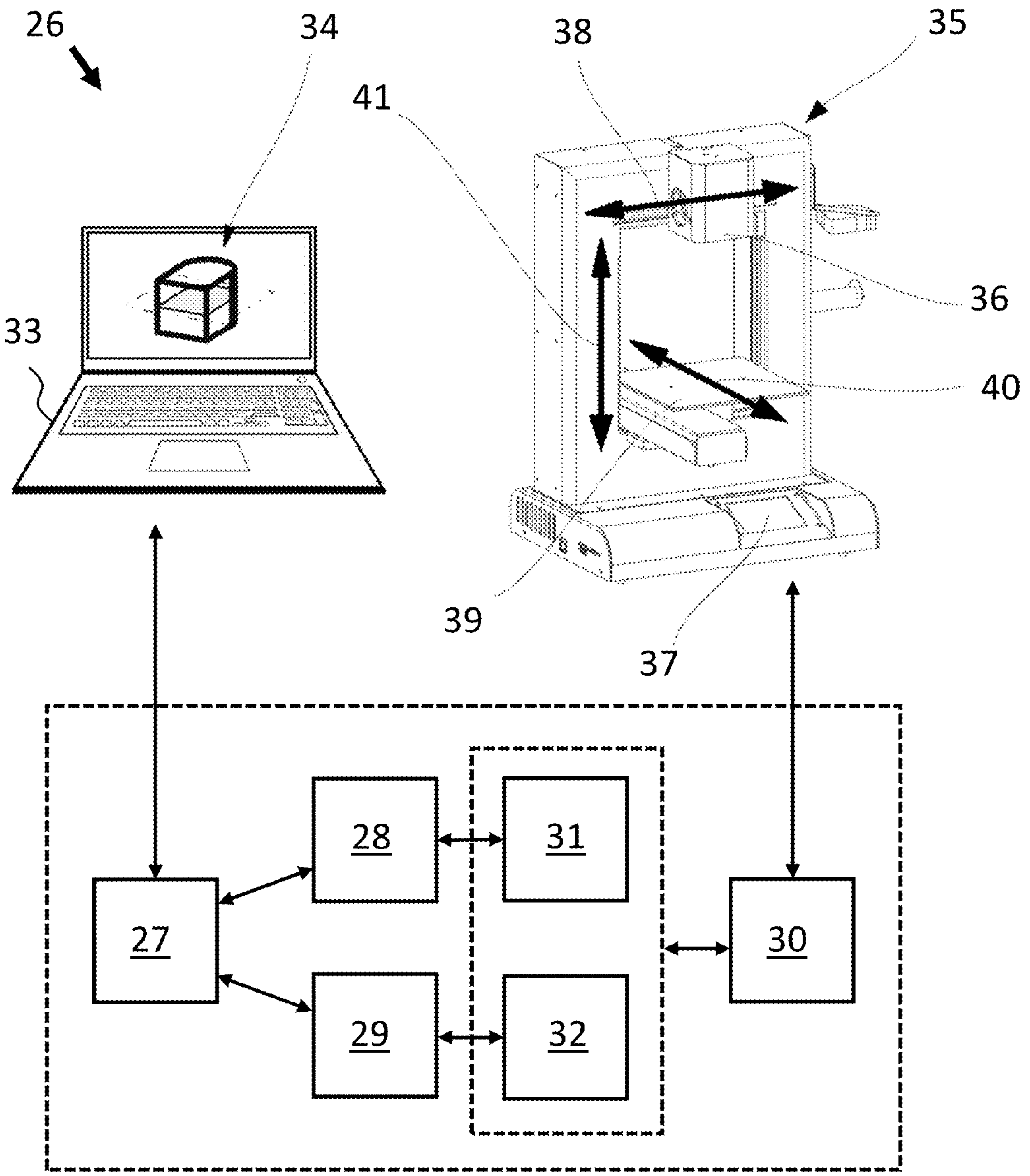

FIG. 9 schematically illustrates a computer system 26 according to an embodiment of the invention.

The embodiment comprises a computer 33 configured to automatically generate infill patterns 31 and relative infill layer orientations 32 and transmit representations of these to a 3D printer 35, which in turn is configured to print an article based on digital models or instructions received from the computer 33.

The automated generation of infill patterns 31 and relative infill layer orientations 32 is based on computerized blocks 27-30, which form part of a software for generating digital layouts of articles to be printed by a 3D printer.

The computer system comprises a user input block 27 through which a user can provide input upon which an infill pattern design block 28 and a pattern orientation block 29 automatically generates the digital infill patterns 31 and the digital relative infill layer orientation 32. In this embodiment, the system 26 is configured such that the user can provide a target hardness of an article to be printed. This target hardness is indicative of a hardness which the user intents an eventually printed article to have in a direction perpendicular to the planes of the layers of the article. The computer 33 comprises a user interface 34 through which a user can provide input such as this target hardness.

When the target hardness is provided, the infill pattern design block 28 automatically defines digital infill patterns 31, namely a first infill pattern, a second infill pattern, and a third infill pattern based on this target hardness. In this exemplary embodiment, the cross-sectional widths of lines of these infill patterns is selected so as to approximately provide the intended hardness to the articles which is eventually printed.

Alternatively, or additionally, the spacing/gaps between lines in infill patterns can be selected based on the target hardness, or the infill patterns can be selected from a digital library of various potential infill patterns (or combinations thereof) which each provide a different hardness.

When the digital infill patterns 31 have been defined by the infill pattern design block 28, the pattern orientation block 29 proceeds to automatically establish the digital relative infill layer orientation 32. This relative infill layer orientation 32 is indicative of orientation among layers printed based on the digital infill patterns 31 when these are eventually printed.

In practice, the pattern orientation block 29 ensures that when a first set of layers, a transitional set of layers, and a second set of layers are printed based on the digital infill patterns 31 and the digital relative infill layer orientation 32, then a first general direction of lines in a first contact layer is different from a second general direction of lines in a second contact layer. Here, the first contact layer is a layer of the first set of layers in contact with the transitional set of layers, and the second contact layer is a layer of the second set of layers in contact with the transitional set of layers.

Optionally, the pattern orientation block may, for example, additionally establish specific orientations of layers printed based on the transitional infill pattern and/or relative orientations among neighbouring within the first set of layers and the second set of layers.

In practice, in this embodiment, the pattern orientation block 29 establishes the relative infill layer orientation 32 after the infill pattern design block 28 has established the digital infill patterns 31. In other embodiments, the digital infill patterns 31 and the digital relative infill layer orientation 32 are generated iteratively depending on each other. In even other embodiments, the relative infill layer orientation 32 is pre-set prior to defining the digital infill patterns 31. In practice, the infill pattern design block 28 and the pattern orientation block 29 can be implemented as a single computerized block.

When the digital infill patterns 31 and the digital relative infill layer orientation 32 have been generated, representations of these are transmitted to the 3D printer 35. Specifically, the digital infill patterns 31 and the relative infill layer orientation 32 are transmitted in a format in which they are readable by the 3D printer, for example as G-code, upon which the 3D printer 35 can print an article.

The 3D printer comprises a printer controller 37 configured to control the functionalities of the printer required to print articles, such as extrusion, heating, and motion. Upon receiving adequate representations of the digital infill patterns 31 and the relative infill layer orientation 32 from the infill transmission block 30, the printer 35 can proceed to print an article accordingly. Naturally, articles to be printed often comprise an exterior surface in addition to an interior infill, which can similarly be transmitted to the printer 35.

The illustrated printer 34 is extrusion based. It comprises a printer head 36 from which material is deposited. The relative position at which material is deposited is controlled by moving the printer head 36 on an x-axis 38, or moving the print bed 39 on a y-axis 40, or a z-axis 41. Thereby, independent control of three axes 38,40,41 of a cartesian coordinates system is provided, allowing for creation of any arbitrary three-dimensional path. The actual positioning is accomplished using timing belts, pulleys, and stepper motors operated in an open loop configuration via the printer controller 37.

Figure 10:
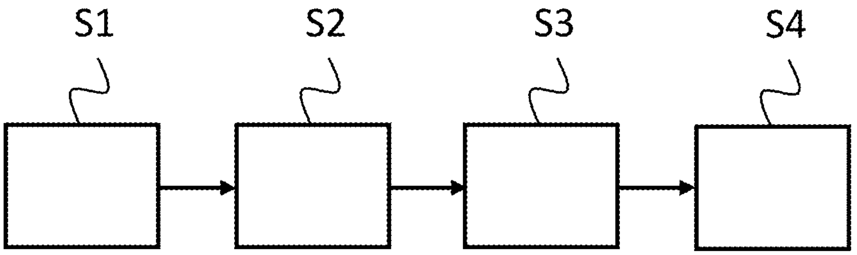
FIG. 10 illustrates method steps according to an embodiment of the invention.

FIG. 10 illustrates method steps S1-S4 according to an embodiment of the invention. The embodiment relates to a method of printing an interior infill using a 3D printer.

In a first step S1 of the method, a planar first infill pattern of lines is defined. Respective lines of this first infill pattern lengthwise extend in a first general direction and have a spatially periodic waveform shape with a component perpendicular to the first general direction. Moreover, respective lines of the first infill pattern have a first cross-sectional width.

In a next step S2 of the method, a planar second infill pattern of lines is defined. Respective liens of this second infill pattern lengthwise extend in a second general direction and have a spatially period waveform shape with a component perpendicular to the second general direction. In addition, respective lines of the second infill pattern have a second cross-sectional width.

In a next step S3 of the method, a planar transitional infill pattern of lines is defined. Respective lines of the transitional infill pattern have a third cross-sectional width. This third cross-sectional width exceeds the first cross-sectional width and the second cross-sectional width.

The first infill pattern, the second infill pattern, and the third infill pattern can each be defined manually, automatically, or partly manually and automatically.

In a next step S4 of the method, layers are printed by the 3D printer. Namely, a first set of layers of the first infill pattern is printed, a transitional set of layers of the transitional infill pattern is printed, and a second set of layers of the second infill pattern is printed. These sets of layers are printed such that the transitional set of layers is printed between the first set of layers and the second set of layers. The first set of layers comprises a first contact layer in contact with the transitional set of layers and the second set of layers comprises a second contact layer in contact with the transitional set of layers. Further, the layers are printed such that the first general direction of the first contact layer is different from the second general direction of the second contact layer.

Note that embodiments of the invention are not limited to a particular sequence of preforming the steps. For example, the steps S1-S3 of defining the first infill pattern, defining the second infill pattern, and designing the transitional infill pattern can be performed simultaneously.

LIST OF FIGURE REFERENCES

1. filament supply
2. filament
3. extruder
4. nozzle
5. arrow indicative of motion structure movement
6. adding position where material is added
7. stage
8. arrow indicative of stage movement
9. line of infill pattern
10. printed line
11. first set of layers
12. second set of layers
13. transitional set of layers
14. first contact layer
15. second contact layer
16. first general direction
17. second general direction
18. infill pattern
19. relative rotation
20. layers
21. residue
22. spatial overlap
23. second transitional set of layers
24. cross-sectional width
25. gap between neighbouring lines
26. computer system
27. user input block
28. infill pattern design block
29. pattern orientation block
30. infill transmission block
31. digital infill patterns
32. digital relative infill layer orientation
33. computer
34. user interface
35. 3D printer
36. printer head
37. printer controller
38. x-axis
39. print bed
40. y-axis
41. z-axis
S1-S4 method steps

LIST OF NUMBERED EMBODIMENTS

1. A method of printing an interior infill using a 3D printer, the method comprising the steps of:
defining a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width;
defining a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width;
defining a planar transitional infill pattern of lines, wherein respective lines of the transitional infill pattern have a third cross-sectional width exceeding the first cross-sectional width and the second cross-sectional width; and
printing a first set of layers of the first infill pattern, a transitional set of layers of the transitional infill pattern, and a second set of layers of the second infill pattern such that the transitional set of layers is printed between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer.
2. A method according to embodiment 1, wherein the first general direction of the first contact layer and the second general direction of the second contact layer differ by at least 20 degrees, for example at least 40 degrees, for example at least 60 degrees, such as at least 80 degrees.
3. A method according to any of the preceding embodiments, wherein the first general direction in layers of the first set of layers is rotated relative to neighbouring layers of the first set of layers; and/or the second general direction in layers of the second set of layers is rotated relative to neighbouring layers of the second set of layers.
4. A method according to any of the preceding embodiments, wherein a spatial overlap between the first contact layer and the second contact layer is less than a spatial overlap between the first contact layer and its neighbouring layer in the transitional set of layers and less than a spatial overlap between the second contact layer and its neighbouring layer in the transitional set of layers.

5. A method according to any of the preceding embodiments, wherein a spatial overlap between the first contact layer and its neighbouring layer in the transitional set of layers is at least 70% relative to the first contact layer, for example at least 80%, such as at least 90%; and/or wherein a spatial overlap between the second contact layer and its neighbouring layer in the transitional set of layers is at least 70% relative to the second contact layer, for example at least 80%, such as at least 90%.

6. A method according to any of the preceding embodiments, wherein respective lines of the transitional infill pattern lengthwise extend in a third general direction.

7. A method according to embodiment 6, wherein the third general direction in layers of the third set of layers is rotated relatively to neighbouring layers of the third set of layers.

8. A method according to any of embodiments 6-7, wherein the first general direction of the first contact layer is substantially similar to the third general direction of a layer of the transitional set of layers neighbouring the first contact layer, and/or wherein the second general direction of the second contact layer is substantially similar to the third general direction of a layer of the transitional set of layers neighbouring the second contact layer.

9. A method according to any of the preceding embodiments, wherein the transitional set of layers comprises at least two layers, such as two layers.

10. A method according to any of the preceding embodiments, wherein a residue between the transitional infill pattern and printed layers of the transitional set of layers is less than a residue between the first infill pattern and printed layers of the first set of layers and/or less than a residue between the second infill pattern and printed layers of the second set of layers.

11. A method according to any of the preceding embodiments, wherein the transitional infill pattern is defined based on the first infill pattern and/or the second infill patterns.

12. A method according to any of the preceding embodiments, wherein the second infill pattern is the first infill pattern.

13. A method according to any of the preceding embodiments, wherein a printing speed is at least 20% greater while a layer of any of the first set of layers and the second set of layers is printed in comparison with a printing speed while a layer of the transitional set of layers is printed, for example at least 40% greater, such as at least 60% greater.

14. A method according to any of the preceding embodiments, wherein the third cross-sectional width is at least 20% greater than any of the first cross-sectional width and the second cross-sectional width, for example at least 40% greater, such as at least 60% greater.

15. A method according to any of the preceding embodiments, wherein a number of layers in the transitional set of layers is less than a number of layers in any of the first set of layers and the second set of layers, for example 50% less, such as 75% less.

16. A method according to any of the preceding embodiments, wherein the transitional set of layers is a first transitional set of layers, wherein the step of printing the first set of layers, the first transitional set of layers, and the second set of layers further comprises printing a second transitional set of layers of the transitional infill pattern such that the second set of layers of the second infill pattern is printed between and in contact with the second transitional set of layers and the first transitional set of layers.

17. A method according to embodiment 16, wherein the second transitional set of layers is substantially similar to the first transitional set of layers.

18. A method according to any of embodiments 16-17, wherein the step of printing the first set of layers, the first transitional set of layers, the second set of layers, and the second transitional set of layers is repeated to spatially and periodically reproduce:

a recurrence of the first set of layers printed between and in contact with a recurrence of the first transitional set of layers and a recurrence of the second transitional set of layers;

a recurrence of the first transitional set of layers printed between and in contact with a recurrence of the first set of layers and a recurrence of the second set of layers;

a recurrence of the second set of layers printed between and in contact with a recurrence of the second transitional set of layers and a recurrence of the first transitional set of layers; and a recurrence of the second transitional set of layers printed between and in contact with a recurrence of the second set of layers and a recurrence of the first set of layers.

19. A method according to any of the preceding embodiments, wherein neighbouring lines in layers of the first set of layers are spaced apart and neighbouring lines in layers of the second set of layers are spaced apart.

20. A method according to any of the preceding embodiments, wherein gaps between respective neighbouring lines in layers of the first set of layers are less than the component perpendicular to the first general direction of the first infill pattern, and/or wherein gaps between respective neighbouring lines in layers of the second set of layers are less than the component perpendicular to the second general direction of the second infill pattern.

21. A method according to any of the preceding embodiments, wherein the steps of defining the planar first infill pattern, defining the planar second infill pattern, and defining the planar transitional infill pattern is performed automatically by a computer system.

22. A method according to any of the preceding embodiments, wherein the relative magnitudes of the first cross-sectional width, the second cross-sectional width, and the third cross-sectional width are automatically established based on a target hardness of the interior infill.

23. A method according to any of the preceding embodiments, wherein each layer of the first set of layers, the transitional set of layers, and the second set of layers are surrounded by a respective circumferential boundary line of a set of exterior boundary lines which collectively form an exterior surface around the interior infill.

24. A method according to any of the preceding embodiments, wherein each line of the first infill pattern and the second infill pattern has a spatial periodic waveform shape which is triangular, sinusoidal, or trapezoidal.

25. A method according to any of the preceding embodiments, wherein, for the transitional set of layers, each layer extends in a general direction which is rotated by an equidistant angle relative to general directions of its two neighbouring layers.
26. A method according to any of the preceding embodiments, wherein the transitional set of layers comprises at least one layer in which respective lines extend in the first general direction and at least one layer in which respective lines extend in the second general direction.
27. A computer system for designing an interior infill of an article to be 3D printed, the computer system comprising:

an infill pattern design block configured to define a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width, the infill pattern design block further configured to define a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width, the infill pattern design block further configured to define a planar transitional infill pattern of lines, wherein respective lines of the transitional infill pattern have a third cross-sectional width exceeding the first cross-sectional width and the second cross-sectional width;

a pattern orientation block configured to automatically establish a relative infill layer orientation among layers of a first set of layers of the first infill pattern, of a transitional set of layers of the transitional infill pattern, and of a second set of layers of the second infill pattern, wherein the transitional set of layers is printed between the first set of layers and the second set of layers, wherein the first set of layers comprises a first contact layer in contact with the transitional set of layers and the second set of layers comprises a second contact layers in contact with the transitional set of layers, wherein the first general direction of the first contact layers is different from the second general direction of the second contact layer; and an infill transmission block configured to transmit the first infill pattern, the second infill pattern, the transmission infill pattern, and the relative infill layer orientation established by the pattern orientation block to a 3D printer.

28. A computer system according to embodiment 27, wherein the computer system comprises a user input block in which a user can input a desired target hardness, upon which the infill pattern design block automatically defines any of the first infill pattern, the second infill pattern, the transitional infill pattern, and the relative infill layer orientation.
29. A computer system according to any of embodiments 27-28, wherein any of the first cross-sectional width, the second cross-sectional width, and the third cross-sectional width are automatically established based on the target hardness.
30. A computer system according to any of embodiments 28-29, wherein the target hardness is a non-uniform across the article to be 3D printed.
31. A computer system according to any of embodiments 27-30, wherein the computer system further comprises a set number block configured to automatically establish the relative number of layers among the first set of layers, the second set of layers, and the third set of layers.
32. A computer system according to any of embodiments 27-31, wherein the computer system is configured to print the interior infill according to the method of any of embodiments 1-26.
33. An article having a layered interior infill, the interior infill comprising:

a first set of layers, each layer of the first set of layers having a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width;

a second set of layers, each layer of the second set of layers having a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width; and a transitional set of layers, each layer of the transitional set of layers having a planer transitional infill pattern of lines, wherein respective lines of the transitional infill pattern have a third cross-sectional width exceeding the first cross-sectional width and the second cross-sectional width, wherein the transitional set of layers is positioned between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer.

34. An article according to embodiment 33, wherein the article comprises an exterior surface around the interior infill, wherein each layer of the first set of layers, the transitional set of layers, and the second set of layers are surrounded by a respective circumferential boundary line of a set of exterior boundary lines which collectively form the exterior surface.
35. An article according to any of embodiments 33-34, wherein the transitional set of layers is a first transitional set of layers, wherein the interior infill further comprises a second transitional set of layers, wherein the second set of layers is positioned between and in contact with the first transitional set of layers and the second transitional set of layers.
36. An article according to any of embodiments 33-35, wherein the article is a footwear insole or footwear inlay.
37. An article according to any of embodiments 33-36, wherein a material of the article is a thermoplastic material.
38. An article according to any of embodiments 33-37, wherein the article is 3D printed, for example according to the method of any of embodiments 1-26.

The invention claimed is:

1. A method of printing an interior infill using a 3D printer, the method comprising the steps of:

defining a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width;

defining a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width;

defining a planar transitional infill pattern of lines, wherein respective lines of the transitional infill pattern have a third cross-sectional width exceeding the first cross-sectional width and the second cross-sectional width; and printing a first set of layers of the first infill pattern, a transitional set of layers of the transitional infill pattern, and a second set of layers of the second infill pattern such that the transitional set of layers is printed between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer.

2. The method according to claim 1, wherein the first general direction of the first contact layer and the second general direction of the second contact layer differ by at least 20 degrees.

3. The method according to claim 1, wherein the first general direction in layers of the first set of layers is rotated relative to neighboring layers of the first set of layers; and/or the second general direction in layers of the second set of layers is rotated relative to neighboring layers of the second set of layers.

4. The method according to claim 1, wherein a spatial overlap between the first contact layer and the second contact layer is less than a spatial overlap between the first contact layer and its neighboring layer in the transitional set of layers and less than a spatial overlap between the second contact layer and its neighboring layer in the transitional set of layers.

5. The method according to claim 1, wherein a residue between the transitional infill pattern and printed layers of the transitional set of layers is less than a residue between the first infill pattern and printed layers of the first set of layers and/or less than a residue between the second infill pattern and printed layers of the second set of layers.

6. The method according to claim 1, wherein the transitional infill pattern is defined based on the first infill pattern and/or the second infill patterns.

7. The method according to claim 1, wherein a printing speed is at least 20% greater while a layer of any of the first set of layers and the second set of layers is printed in comparison with a printing speed while a layer of the transitional set of layers is printed.

8. The method according to claim 1, wherein the third cross-sectional width is at least 20% greater than any of the first cross-sectional width and the second cross-sectional width.

9. The method according to claim 1, wherein a number of layers in the transitional set of layers is less than a number of layers in any of the first set of layers and the second set of layers.

10. A computer system for designing an interior infill of an article to be 3D printed, the computer system comprising:

an infill pattern design block configured to define a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width, the infill pattern design block further configured to define a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width, the infill pattern design block further configured to define a planar transitional infill pattern of lines, wherein respective lines of the transitional infill pattern have a third cross-sectional width exceeding the first cross-sectional width and the second cross-sectional width;

a pattern orientation block configured to automatically establish a relative infill layer orientation among layers of a first set of layers of the first infill pattern, of a transitional set of layers of the transitional infill pattern, and of a second set of layers of the second infill pattern, wherein the transitional set of layers is printed between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer; and an infill transmission block configured to transmit the first infill pattern, the second infill pattern, the transmission infill pattern, and the relative infill layer orientation established by the pattern orientation block to a 3D printer.

11. The computer system according to claim 10, wherein the computer system comprises a user input block in which a user can input a desired target hardness, upon which the infill pattern design block automatically defines any of the first infill pattern, the second infill pattern, the transitional infill pattern, and the relative infill layer orientation.

12. The computer system according to claim 10, wherein the computer system is configured to print the interior infill according to a method of printing the interior infill using the 3D printer, the method comprising the steps of:

defining the planar first infill pattern of lines, wherein respective lines of the first infill pattern lengthwise extend in the first general direction and have the spatially periodic waveform shape with the component perpendicular to the first general direction, wherein respective lines of the first infill pattern have the first cross-sectional width;

defining the planar second infill pattern of lines, wherein respective lines of the second infill pattern lengthwise extend in the second general direction and have the spatially periodic waveform shape with the component perpendicular to the second general direction, wherein respective lines of the second infill pattern have the second cross-sectional width;

defining the planar transitional infill pattern of lines, wherein respective lines of the transitional infill pattern have the third cross-sectional width exceeding the first cross-sectional width and the second cross-sectional width; and printing the first set of layers of the first infill pattern, the transitional set of layers of the transitional infill pattern, and the second set of layers of the second infill pattern such that the transitional set of layers is printed between the first set of layers and the second set of layers, wherein the first set of layers comprises the first contact layer in contact with the transitional set of layers and the second set of layers comprises the second contact layer in contact with the transitional set of layers, wherein the first general direction of the first contact layer is different from the second general direction of the second contact layer.

13. An article having a layered interior infill, the interior infill comprising:

a first set of layers, each layer of the first set of layers having a planar first infill pattern of lines, wherein respective lines of the first infill pattern lengthwise extend in a first general direction and have a spatially periodic waveform shape with a component perpendicular to the first general direction, wherein respective lines of the first infill pattern have a first cross-sectional width;

a second set of layers, each layer of the second set of layers having a planar second infill pattern of lines, wherein respective lines of the second infill pattern lengthwise extend in a second general direction and have a spatially periodic waveform shape with a component perpendicular to the second general direction, wherein respective lines of the second infill pattern have a second cross-sectional width; and a transitional set of layers, each layer of the transitional set of layers having a planer transitional infill pattern of lines, wherein respective lines of the transitional infill pattern have a third cross-sectional width exceeding the first cross-sectional width and the second cross-sectional width, wherein the transitional set of layers is positioned between the first set of layers and the second set of layers, wherein the first set of layers comprises a first contact layer in contact with the transitional set of layers and the second set of layers comprises a second contact layer in contact with the transitional set of layers, wherein the first general direction of the first contact layer is different from the second general direction of the second contact layer.

14. The article according to claim 13, wherein the article is a footwear insole or footwear inlay.

15. The article according to claim 13, wherein the article is 3D printed, according to a method of printing the interior infill using a 3D printer, the method comprising the steps of:

defining the planar first infill pattern of lines, wherein respective lines of the first infill pattern lengthwise extend in the first general direction and have the spatially periodic waveform shape with the component perpendicular to the first general direction, wherein respective lines of the first infill pattern have the first cross-sectional width;

defining the planar second infill pattern of lines, wherein respective lines of the second infill pattern lengthwise extend in the second general direction and have the spatially periodic waveform shape with the component perpendicular to the second general direction, wherein respective lines of the second infill pattern have the second cross-sectional width;

defining the planar transitional infill pattern of lines, wherein respective lines of the transitional infill pattern have the third cross-sectional width exceeding the first cross-sectional width and the second cross-sectional width; and printing the first set of layers of the first infill pattern, the transitional set of layers of the transitional infill pattern, and the second set of layers of the second infill pattern such that the transitional set of layers is printed between the first set of layers and the second set of layers, wherein the first set of layers comprises the first contact layer in contact with the transitional set of layers and the second set of layers comprises the second contact layer in contact with the transitional set of layers, wherein the first general direction of the first contact layer is different from the second general direction of the second contact layer.

* * * * *